(12) United States Patent
Olliges

(10) Patent No.: US 6,257,523 B1
(45) Date of Patent: Jul. 10, 2001

(54) FOLDABLE PARTITION WITH INTEGRAL DOOR

(75) Inventor: Michael J. Olliges, Bothell, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/457,782

(22) Filed: Dec. 9, 1999

(51) Int. Cl.⁷ ..................................................... B64D 11/00
(52) U.S. Cl. ................................. 244/118.5; 244/129.5; 160/84.04; 160/210
(58) Field of Search ........................... 244/118.1, 118.5, 244/119, 129.4, 129.5; 52/71, 69; 160/84.4, 210, 84.01, 84.08

(56) References Cited

U.S. PATENT DOCUMENTS

| 2,396,039 | * | 3/1946 | Burton et al. | |
| 4,185,799 | * | 1/1980 | Richards | 244/118.5 |
| 4,375,876 | * | 3/1983 | Stewart | 244/129.5 |
| 4,597,549 | | 7/1986 | Ryan . | |
| 4,932,172 | | 6/1990 | Maas . | |
| 5,214,885 | | 6/1993 | Maas . | |
| 5,393,013 | * | 2/1995 | Schneider et al. | 244/118.5 |
| 5,577,358 | | 11/1996 | Franke . | |

FOREIGN PATENT DOCUMENTS

3917206 * 5/1990 (DE) ................................. 244/118.5

* cited by examiner

Primary Examiner—Charles T. Jordan
Assistant Examiner—Tien Dinh
(74) Attorney, Agent, or Firm—Ann K. Galbraith

(57) ABSTRACT

A stowable aircraft cabin vertical partition comprising (1) at least three rigid rectangular-shaped panels attached to each other by panel hinges along the horizontal joints between the panels, that permit the partition to hang vertically when in use and to be fan folded along the joints when stowed (2) a partition support to which the partition is attached near or along its top edge, (3) a stowage support which holds the fan-folded partition next to the support for stowage; wherein a portion of the panels form a vertically-hinged cabin access door having a sufficient number of vertical and horizontal hinges to keep the panels of the access door in a planar alignment with each other when the partition is in use, and to be fan folded with the rest of the partition when the partition is stowed.

10 Claims, 5 Drawing Sheets

FOLDABLE PARTITION WITH INTEGRAL DOOR

BACKGROUND OF THE INVENTION

It is known to provide modules with doors in the passenger cabin of aircraft for such uses as storage. It is also known to utilize space adjacent to the doorway of the exterior aircraft door when the door is not in use by providing fold-down seating space therein for the flight or attendant crew. However, such seating space is not private and the use of a curtain to partition the space may not provide sufficient privacy to permit changing clothes or sleeping in the space during long flights.

BRIEF SUMMARY OF THE INVENTION

In one aspect, this invention is a stowable aircraft cabin vertical partition comprising (1) at least three rigid rectangular-shaped panels attached to each other by panel hinges along the horizontal joints between the panels, that permit the partition to hang vertically when in use and to be fan folded along the joints when stowed (2) a partition support to which the partition is attached near or along its top edge, (3) a stowage support which holds the fan-folded partition next to the support for stowage; wherein a portion of the panels form a vertically-hinged cabin access door having a sufficient number of vertical and horizontal hinges to keep the panels of the access door in a planar alignment with each other when the partition is in use, and to be fan folded with the rest of the partition when the partition is stowed. The partition may be positioned so that it encloses the space adjacent to an aircraft exterior door and between partitions or modules located fore and aft of the exterior door, from the rest of the passenger cabin.

DETAILED DESCRIPTION OF THE INVENTION

Figure 1:
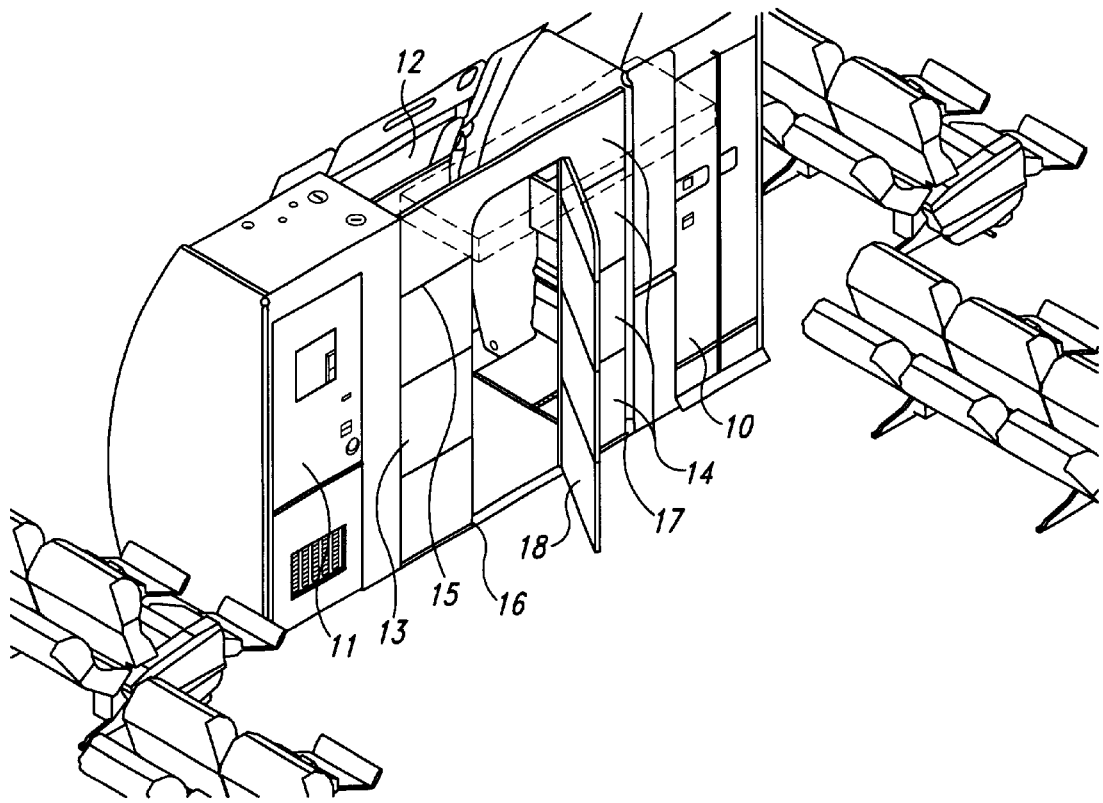
FIGS. 1 and 3 show an aircraft cabin partition positioned in front of an aircraft door and between two aircraft cabin modules.

FIG. 1 illustrates a portion of a passenger cabin of an aircraft having a lavatory module 10 and an audio/visual equipment module 11, with an aircraft exterior door 12 in-between. In one embodiment, the foldable partition B comprises a plurality of rigid panels 14 connected by horizontal hinges 15 divides the doorway space between the modules from the rest of the passenger cabin, and encloses the space adjacent to the aircraft door. The partition preferably has a plurality of latches or other releasable locking means 16, 17 positioned along the edge of the partition to secure it in position during use. The partition has a door 18 with an interior lock to permit privacy in the space surrounded by the modules, aircraft exterior door, and the foldable partition. The door comprises a plurality of panels with hinges that are aligned horizontally with the horizontal hinges of the other panels of the partition. The panels and door frame fit closely together when the door is closed and, along with any optional protective, insulating, or ornamental edgings for the door or frame, provide privacy to the occupant of the enclosed space. In the embodiment shown, the partition is positioned between a lavatory and audio/visual equipment module. However, it may be positioned at any location in the aircraft cabin, preferably in front of any aircraft exterior door at any location where it can form a fully partitioned space with other partitions, monuments, or modules in the aircraft.

The partition is comprised of a series of flat panels that are connected by horizontal hinges so that the partition may be readily folded or unfolded. The panels may be of any suitable shape and size, so long as the hinges that permit the partition to be folded are positioned horizontally. The panels may be made of any suitable material that is sufficiently rigid to permit the panels to remain substantially flat as the partition is folded and stowed. Preferably, the panels are comprised of a rigid lightweight material such as an insulating foam board, a graphite composite with a foam core, or a fiberglass panel with a honeycomb core. All or part of the edges of the panels may, if desired, be reinforced or covered with a suitable edging material, such as a metal or hard plastic material to protect the edges of a panel made from a softer material from wear and tear.

Figure 2C:
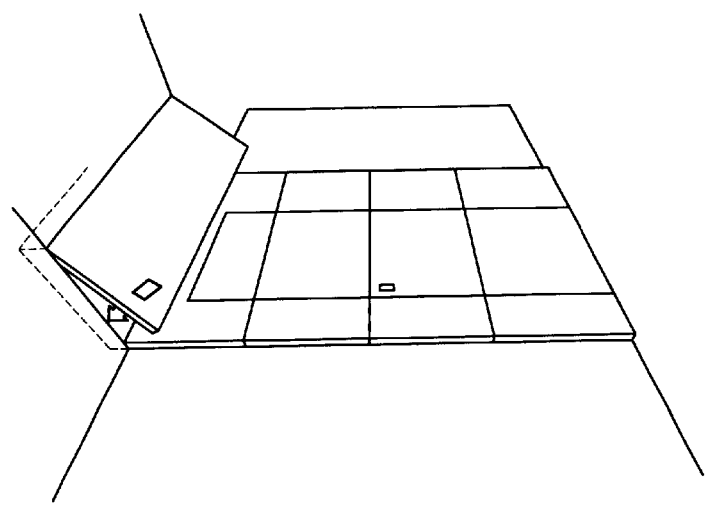
FIGS. 2A–C illustrate the partition being opened and lowered from its stowed position next to the ceiling of the aircraft passenger cabin.
Figure 2B:
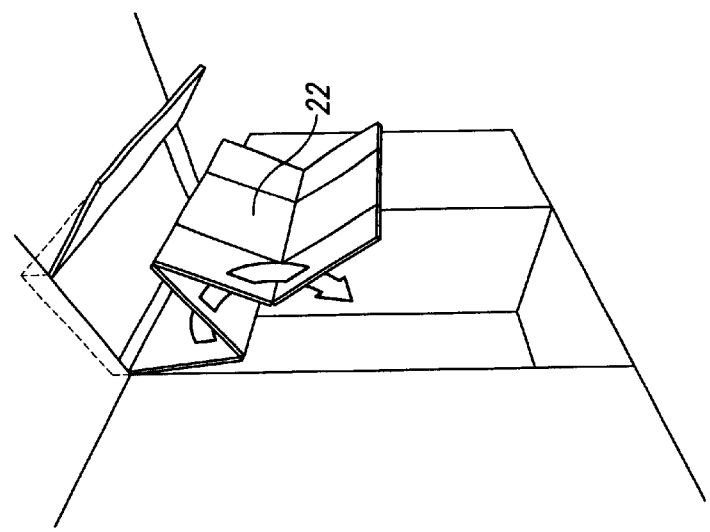
Figure 2A:
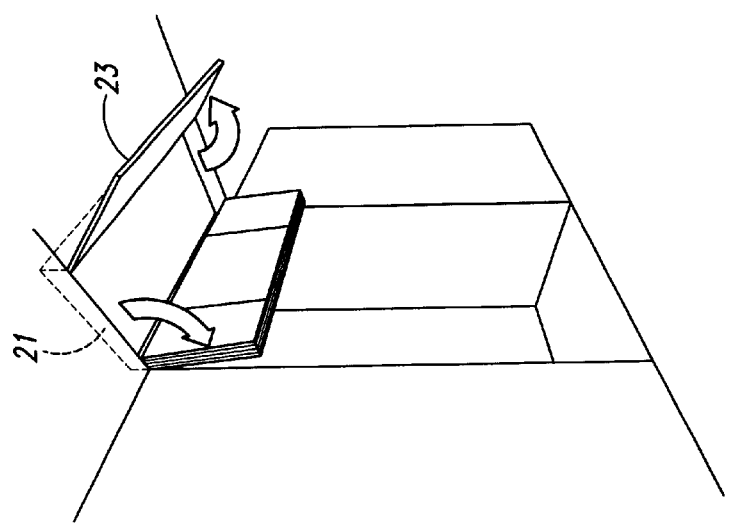

FIGS. 2A–2C illustrate one embodiment of a partition being unfolded from its stored location next to the ceiling of the aircraft and adjacent to the space it will enclose. Since the partition may be anchored to the adjacent dividers or modules at several positions along its edge, if desired, it may provide more privacy than a curtain and occupy less cabin floor space than a door that folds and stores in a sideways direction. The partition is attached along or near its top edge to any suitable type of partition support, from which the partition hangs during stowage and use. When stowed, the partition is fan-folded and attached and secured at a position near the partition support by any suitable type of stowage support, such as a latchable stowage compartment. In the embodiment shown in FIG. 2A, the partition support is a hinge attached to an overhead compartment 21 with a closable door. The compartment is recessed into the ceiling of the passenger cabin of the aircraft, which provides a latchable storage space for the partition 22 in the folded position. In another embodiment, only a portion of the compartment is recessed into the ceiling, or the entire compartment hangs from the ceiling. However, any suitable partition support or stowage support for hanging or securing the door above the passenger cabin may be used such as, for example, a plurality of hooks attached to the ceiling of the cabin. In the embodiment shown, the overhead partition stowage compartment has a door 23 that swings opens toward the middle of the cabin, which allows the folding door to be lowered, as shown in FIG. 2B. The compartment door may then be closed and latched, as shown in FIG. 2C.

The partition support and stowage support are preferably located so that the partition may be stowed at a height of at least 80 inches above the passenger cabin floor, more preferably at least 82 inches, and most preferably at least 84 inches. Likewise, the overall height of the partition is preferably at least as tall as the partition support, although it may be shorter if an open space at the bottom of the partition is acceptable for the application.

Figure 3:
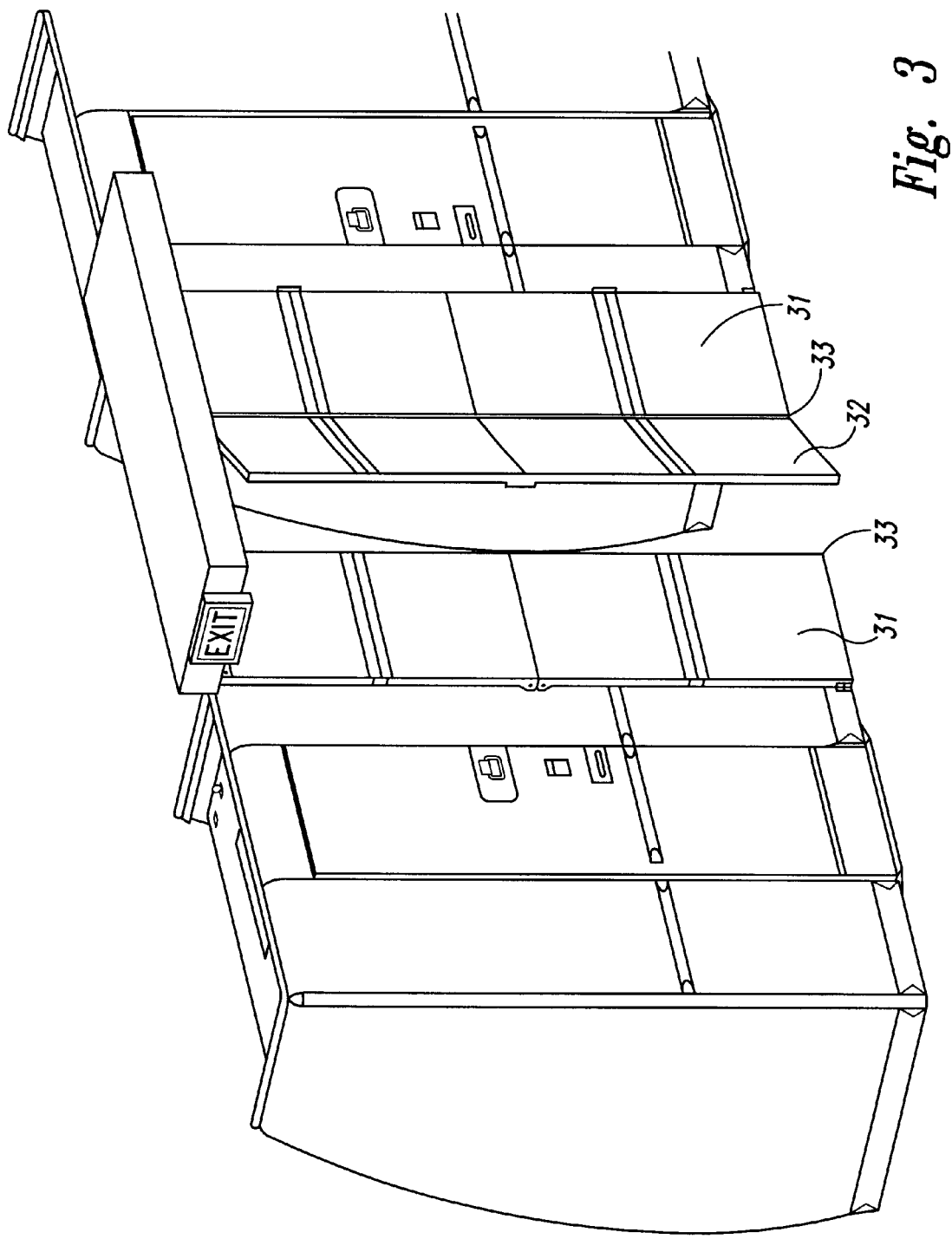

FIG. 3 illustrates a folding partition 31 with a door frame 33 and a lockable hinged cabin access door 32. In this embodiment, the door swings out towards the middle of the cabin, is about the same size as a lavatory door, and is positioned in the middle of the partition. However, any other suitable position and size or type of the door, hinge number, type, and location, or location and type of door opening mechanism or door lock, may be utilized.

Figure 4:
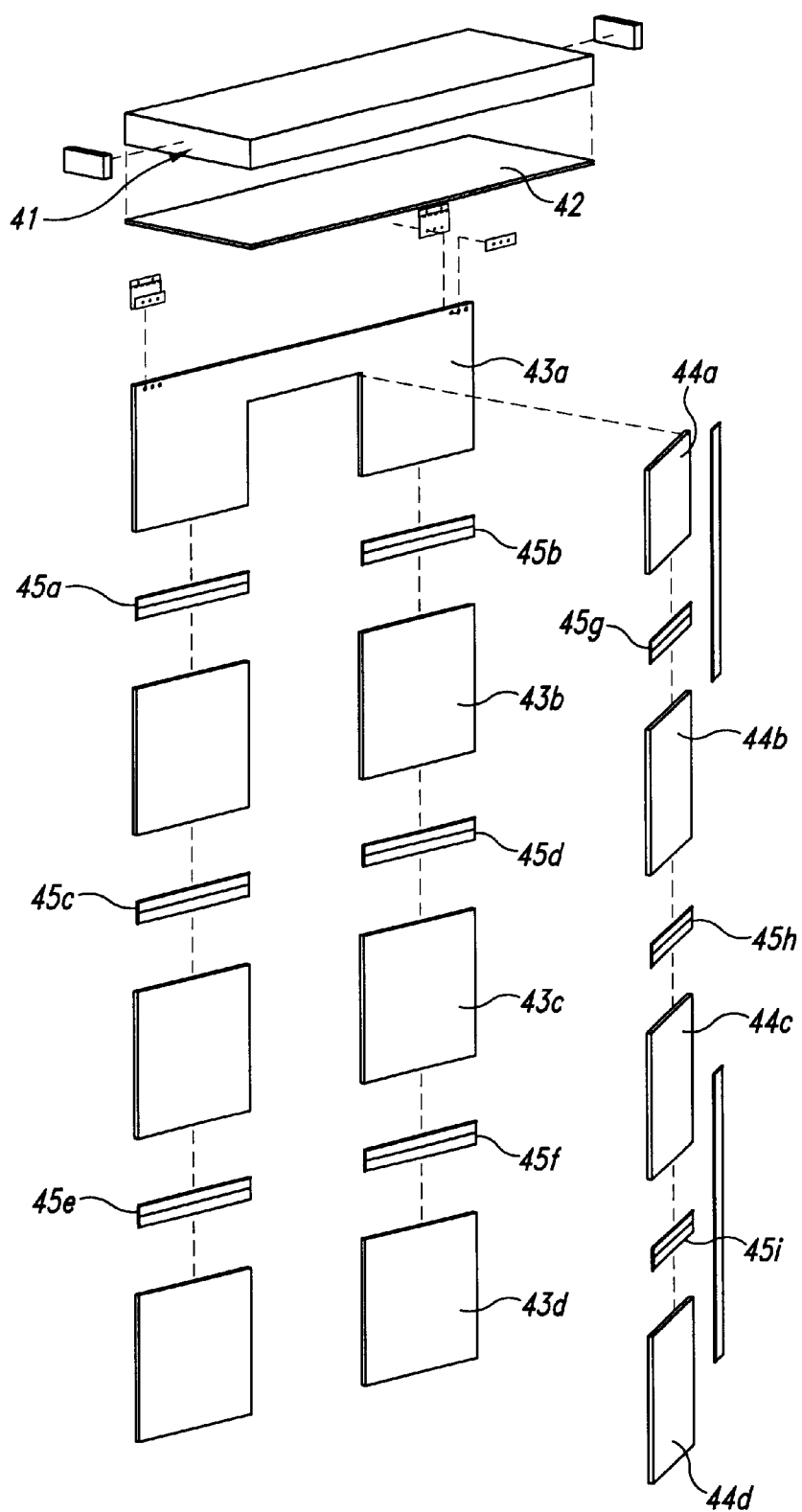
FIG. 4 illustrates the component parts of an aircraft cabin partition.

FIG. 4 is a view of the assembly components of one embodiment of the partition of this invention. A storage compartment 41 for the door is shown having a hinged lid 42 which is opened when the partition is to be set up or stowed. At all other times, the lid of the compartment is preferably kept closed. Partition panels 43*a–d* form the portion of the partition around the door. Partition panels 44*a–d* form the door. The partition panels are connected by horizontal hinges 45*a–i* that allow the panels of the partition and door to be fan folded for storage in the compartment. Any suitable type or length of hinge may be used as a horizontal panel hinge or vertical door hinge to permit the partition to be fan-folded for storage and the door in the partition to be utilized. In one embodiment, the horizontal hinges extend the length of the panel and allow the panels to be fan-folded in either direction. In a preferred embodiment, the hinge is made of a flexible polymeric material such as polystyrene, polyethylene, or polypropylene. More preferably, the hinge is a strip of a polyethylene or polypropylene film material having a width in the range of from 3 to 5 inches and a thickness in the range of from 0.0625 to 0.250 inches, that is adhered to either the interior or exterior side of the panels along each joint with enough space provided between the panels so that each panel may be caused to lie flat against an adjacent panel when the partition is fan-folded along the joints.

Figure 5:
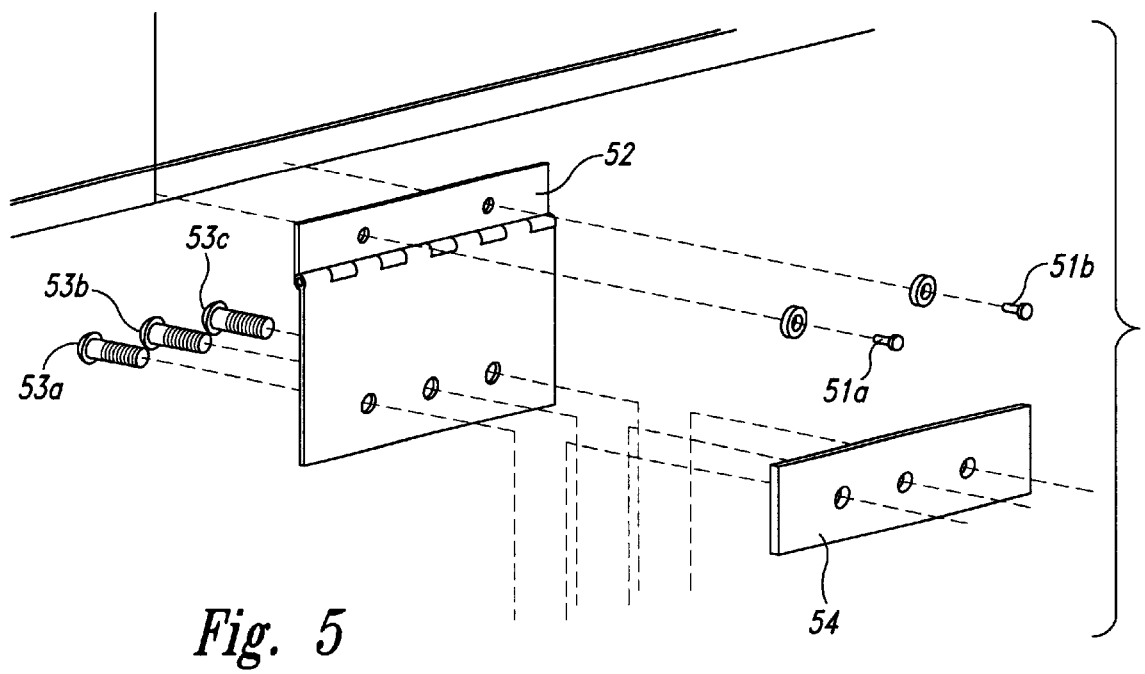
FIG. 5 shows one embodiment of a partition support hinge assembly.

Preferably, the hinges have a tabbed portion that extends beyond the edges of the panel joint by a distance (width) of no greater than the thickness of the panels. Preferably, the tabbed portions have a width of at least 0.5 times the thickness of the panels. When the partition is opened and a tabbed portion is bent in a direction so that it lies flat against the side edge of the partition or partition door, thereby forming an L-shaped portion around a corner of the partition or door, the position of the L-shaped portion against a two-panel joint helps prevent the panel joint from folding during use of the partition, giving it a flatter and neater appearance, as illustrated in FIG. 6. The top of the partition is attached to the storage compartment by hinges 46*a–b*. Exit signs 47*a–b* indicate the location of the aircraft exit door when the partition is in the unfolded position. FIG. 5 shows an embodiment wherein the hinges at the top of the door have a plurality of safety release pins 51*a–b* which allow the partition to be quickly removed from in front of the aircraft door in an emergency. When the safety release pins are pulled out of the hinges, the partition will no longer be attached along its top edge. FIG. 5 also shows a hinge assembly having a hinge 52, threaded fasteners 53*a–c*, and a securing plate 54. This hinge assembly secures the partition to the partition support and provides a means to quickly remove the panel from the aircraft doorway.

Figure 6A:
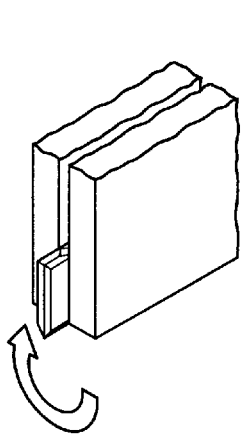
FIG. 6A–6C shows one embodiment of the components of a panel/panel hinge assembly.
Figure 6B:
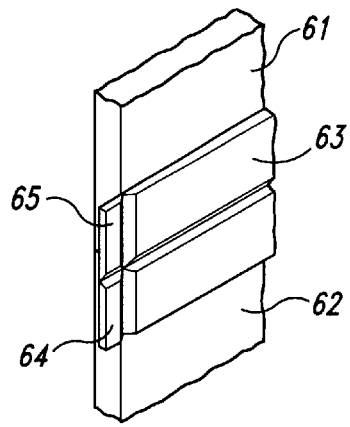
Figure 6C:
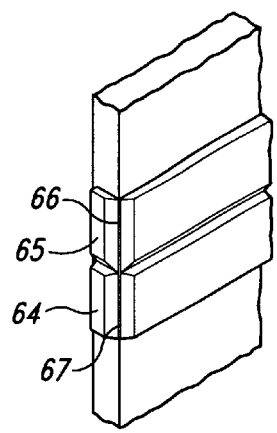

FIGS. 6A–C show one embodiment of a panel hinge with a tabbed portion. The adjacent panels of the partition 61, 62 are connected by a hinge 63 made from an extruded polyethylene material having tabbed portions 64, 65 which extend past the ends of the panels. When the partition is unfolded for use (FIG. 6B) the tabbed portions may be bent around the edge of the panels (FIG. 6C) to help prevent the panel joints from folding during partition use. The tabbed portions preferably have a beveled shape 66, 67 at the panel corners to facilitate their use as a means to lock the panel joint in place.

What is claimed is:

1. A stowable aircraft cabin vertical partition comprising (1) at least three rigid rectangular-shaped panels attached to each other by panel hinges along horizontal joints between the panels, that permit the partition to hang vertically when in use and to be fan folded along the joints when stowed (2) a partition support to which the partition is attached near or along its top edge, (3) a stowage support which holds the fan-folded partition next to the support for stowage; wherein a portion of the panels form a vertically-hinged cabin access door having a sufficient number of vertical and horizontal hinges to keep the panels of the access door in a planar alignment with each other when the partition is in use, and to be fan folded with the rest of the partition when the partition is stowed.

2. The partition of claim 1 wherein the partition is positioned so that the partition encloses the space adjacent to an aircraft exterior door and between walls or modules located fore and aft of the exterior door.

3. The partition of claim 1 wherein the rigid panels are made of lightweight sandwich composite material.

4. The partition of claim 1 wherein the partition hinges are an extruded flexible material adhered to one side of the partition along the panel joints, comprising polystyrene, polyethylene, or polypropylene.

5. The partition of claim 4 wherein the partition hinges have tabbed portions which extend past the outer edge of the partition by a distance of between 0.5 and 1.0 times the width of the panels, and are sufficiently flexible to permit the portions to bend at the corner of the panel.

6. The partition of claim 1 wherein the height of the partition and the distance of the stowed partition from the floor of the passenger cabin, are at least 80 inches.

7. The partition of claim 1 wherein the height of the partition and the distance of the stowed partition from the floor of the passenger cabin, are at least 82 inches.

8. The partition of claim 1 wherein the height of the partition and the distance of the stowed partition from the floor of the passenger cabin, are at least 84 inches.

9. The partition of claim 1 wherein the cabin access door extends vertically across at least two panels.

10. The partition of claim 1 wherein the cabin access door extends vertically across at least three panels.

* * * * *